Oct. 10, 1961 S. N. ROSENTHAL 3,003,184
MARKING DEVICES
Filed July 29, 1959
FIG.1
FIG.2
FIG.3
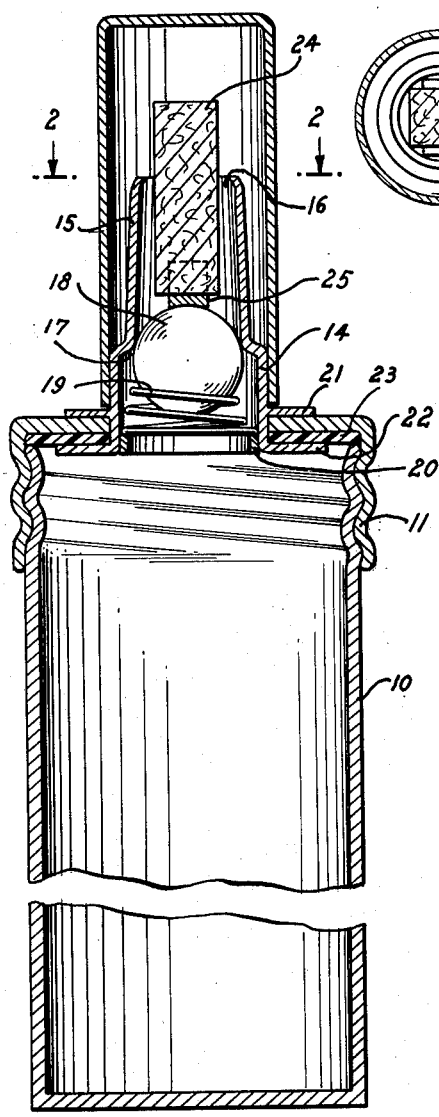
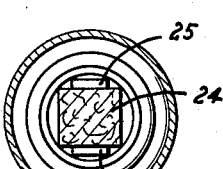
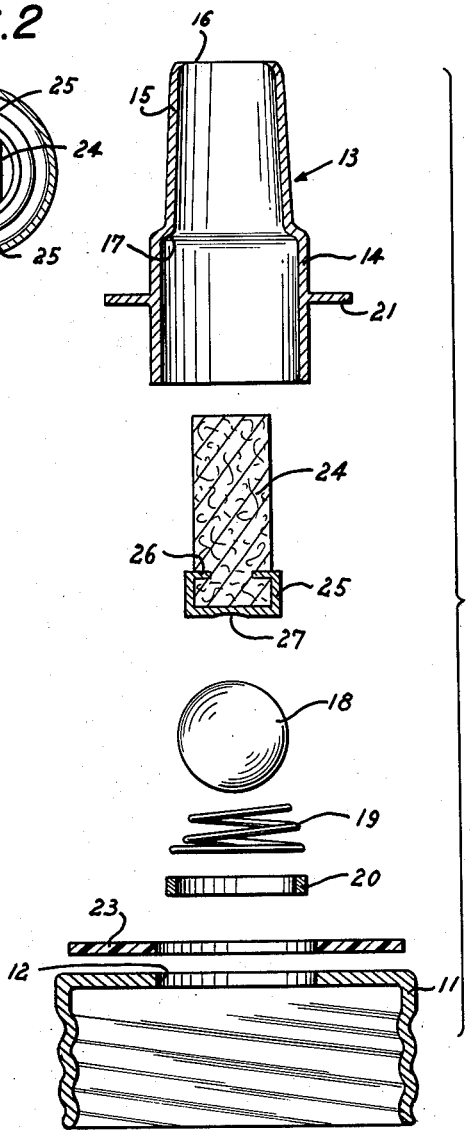
INVENTOR.
Sidney N. Rosenthal
BY
Curtis, Morris & Safford
his attorneys

United States Patent Office 3,003,184
Patented Oct. 10, 1961

3,003,184
MARKING DEVICES
Sidney N. Rosenthal, Belle Harbor, N.Y., assignor to Speedry Chemical Products, Inc., Richmond Hill, N.Y.
Filed July 29, 1959, Ser. No. 830,372
1 Claim. (Cl. 15—581)

The present invention relates to marking devices of the type wherein opaque marking ink is supplied in free flowing condition from an ink container or reservoir to a nib or applicator through a valve controlled opening between the carrier and the nib.

An object of the invention has been to provide an inexpensive but highly effective valve means for a marking device which is substantially leakproof so that the ink supply will not leak out of the marking device and will not deteriorate due to contact with air despite long periods of storage or non-use.

An embodiment of my invention having features which contribute to the purposes above stated will in general comprise an ink reservoir or container screw threaded to receive a cover having a coaxial opening through which ink may be fed from the interior of the container into the interior of a tubular nib holder. Said holder with a nib slidably mounted therein is secured in said opening in the cover. An annular shoulder in the nib holder provides a seat for a spring pressed ball valve which controls passage of ink from the container to the inner end of the nib. A bearing member in the form of a thin, narrow, metal strip extends across the center area of the nib inner end, but the portions of the nib inner end on both sides of the member are exposed for contact with the ink. The ball contacts the center of the bearing member which is depressed to receive a small segment of the ball. Thus, when the nib is pressed inwardly, the ball is pushed away from the shoulder and ink flows around the ball to the exposed areas of the nib inner end. Because the ball may roll slightly in the bearing member depression, hardened ink particles are knocked off the shoulder and ball to maintain a clean metal to metal contact at all times that the ball is seated.

One embodiment of my invention is illustrated in the drawings appended to this specification and wherein:

FIGURE 1 is a view on enlarged scale and in central longitudinal section of the constituent parts assembled in operative relation;

FIGURE 2, a transverse section on the line 2—2 of FIGURE 1; and

FIGURE 3, an exploded view showing certain parts of the device prior to assembly.

Referring to the drawings, a marker as there shown includes an ink confining reservoir or container 10 which is screw threaded at its open end to receive a cap 11 having a coaxial opening 12 in its end wall.

A tubular nib holder 13 of suitable metal, such as aluminum, steel, etc., includes a base portion 14 and a spout 15 which tapers to a relatively restricted opening 16 at its outer end.

A shoulder 17 is formed in the wall of the nib holder in position to provide an annular valve seat at the passageway between said spout 15 and said base 14. A valve ball 18, preferably of corrosion resistant metal, as stainless steel, is normally biased against said seat by a compression spring 19 which is retained in operative position by a ring 20.

Said nib holder is secured in opening 12 of cap 11 by an outer peripheral flange 21 and an inner peripheral flange 22 longitudinally spaced therefrom and forming in effect an annular open channel.

As seen in FIGURE 1, a gasket 23 of or including a non pervious plastic substance is seated against the under or inner surface of the end wall of cap 11 so that, when said holder 13 is assembled with its base portion 14 embraced by said gasket and the lip or edge of cap opening 12, and flange 22 is formed and pressed toward flange 21, said parts are clamped together in effective sealing contact. Also, when cap 11 is screwed on to the open threaded end of container 10, the upper edge thereof bears against said gasket 23 to obstruct leakage of ink between the container 10 and cap 11.

In a preferred embodiment, the ink applicator is in the form of a suitably absorptive felt nib 24 conveniently rectangular in cross sectional contour, as seen in FIGURE 2. Said nib is provided with a foot plate or hand bearing member 25 preferably of a thin, narrow strip of corrosion resistant metal clamped or otherwise secured to extend across the central portion of the inner end of said nib (see FIG. 2), thus transversely covering the central area of the nib end portions at each side of the strip being exposed for contact with the ink. The bearing member is arranged between ball 18 and said nib 24 and in contact with the ball. When the nib is pressed inwardly in use to unseat said ball from the shoulder 17, ink flows through the opening defined by seat 17 and to the nib inner end portions at each side of the bearing member. The bearing member or foot plate 25 is conveniently retained on nib 24 by prongs 26 extending into the nib sufficiently to hold said foot plate on the nib without unduly compressing the inner end thereof. Foot plate 25 is formed with a shallow recess or depression 27 which receives and engages a small segment of the hard spherical surface of ball 18 thus, in use, protecting the inner end portion of nib 24 from direct compressive impact with said ball and steadying the nib in its proper coaxial position in holder 13 against lateral displacement. Also, the ball may roll slightly within the bearing plate depression to thereby cause accumulated hardened particles of ink to be knocked off the ball and shoulder.

Where the nib 24 is rectangular, or substantially square as shown, the outer end opening 16 may, with advantage, be dimensioned to slightly compress outer longitudinal corner portions of the nib 24 so as to help maintain the same in optimum marking position in the bore of holder 13 and, at the same time, permit longitudinal movement therein to and from valve ball actuating position.

What I claim is:

An ink container open at its upper end, a tubular nib holder above and operatively mounted at and in communication with said open upper end of the container, an absorbent felt nib slidable axially in said nib holder with its upper end normally extending beyond the upper end of said nib holder, a spring pressed valve ball arranged and adapted to control the flow of ink from the open end of the container directly to the lower end surface of said nib, said holder having an inner shoulder remote from its upper end to provide a valve seat for said valve ball, and a hard bearing member in the form of a foot plate secured to the lower end of the nib and fixed to it and operatively interposed between said lower end of said nib and said valve ball and arranged and adapted to transmit downward movement of the nib to the valve ball, said member being a thin, narrow metal strip which is narrower than the nib end and centered relative to the nib end, under the nib end and extending transversely across the nib end and thus covering only a central area extending across the lower end of the nib to expose a part of the lower end of the nib at both sides of the strip to thus permit passage of ink from the container to said lower end surface of the nib when the nib and said bearing member are pressed downwardly together to unseat said valve ball, and a ball receiving depression, formed at the center of the strip for loosely receiving a small segment of the ball at all times and forming a bearing within which the ball may roll.

References Cited in the file of this patent

UNITED STATES PATENTS

| | | |
|---|---|---|
| 1,111,537 | Hill | Sept. 22, 1914 |
| 1,141,522 | Boyajean | June 1, 1915 |
| 1,857,467 | Marsh | May 10, 1932 |
| 2,320,823 | Kingson | June 1, 1943 |
| 2,623,227 | Moonert | Dec. 30, 1952 |
| 2,713,176 | Rosenthal | July 19, 1955 |
| 2,806,239 | Wittnebert | Sept. 17, 1957 |

FOREIGN PATENTS

| | | |
|---|---|---|
| 63,044 | France | Mar. 2, 1955 |

(Addition to No. 1,025,878)